United States Patent
Nagineni

(10) Patent No.: US 9,710,367 B1
(45) Date of Patent: Jul. 18, 2017

(54) METHOD AND SYSTEM FOR DYNAMIC TEST CASE CREATION AND DOCUMENTATION TO THE TEST REPOSITORY THROUGH AUTOMATION

(71) Applicant: IP Holding Company LLC, Hopkinton, MA (US)

(72) Inventor: Shylaja Nagineni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/928,986

(22) Filed: Oct. 30, 2015

(51) Int. Cl.
G06F 9/44 (2006.01)
G06F 11/36 (2006.01)

(52) U.S. Cl.
CPC .............................. *G06F 11/3684* (2013.01)

(58) Field of Classification Search
CPC ................................................... G06F 11/3684
See application file for complete search history.

(56) References Cited

U.S. PATENT DOCUMENTS

| | | | | |
|---|---|---|---|---|
| 9,280,453 B1* | 3/2016 | Covarrubias | ....... | G06F 11/3684 |
| 2003/0070118 A1* | 4/2003 | Nakao | ............. | G01R 31/31854 714/30 |
| 2004/0107415 A1* | 6/2004 | Melamed | ............ | G06F 11/3684 717/124 |
| 2005/0193269 A1* | 9/2005 | Haswell | .............. | G06F 11/3684 714/38.13 |
| 2006/0230320 A1* | 10/2006 | Salvador | ............. | G06F 11/3684 714/38.1 |
| 2007/0022407 A1* | 1/2007 | Givoni | ................ | G06F 11/3414 717/124 |
| 2007/0080205 A1* | 4/2007 | You | ...................... | G06F 11/2221 235/375 |
| 2008/0208958 A1* | 8/2008 | Huff | ........................ | G06F 11/30 709/203 |
| 2008/0256315 A1* | 10/2008 | Awai | ................... | G06F 11/1448 711/162 |
| 2011/0202901 A1* | 8/2011 | Givoni | ................ | G06F 11/3414 717/125 |
| 2013/0097586 A1* | 4/2013 | Chandra | ............. | G06F 11/3684 717/124 |
| 2014/0081919 A1* | 3/2014 | Matsumoto | ......... | G06F 11/3495 707/652 |
| 2015/0007149 A1* | 1/2015 | Maddela | ................... | G06F 8/70 717/131 |
| 2015/0168482 A1* | 6/2015 | Flynn | ................. | G01R 31/2889 324/754.07 |
| 2016/0070641 A1* | 3/2016 | Printz | ................. | G06F 11/3692 717/124 |
| 2016/0132420 A1* | 5/2016 | Kuo | ..................... | G06F 11/3684 717/130 |
| 2016/0232061 A1* | 8/2016 | Gaschler | ............. | G06F 11/1461 |

* cited by examiner

Primary Examiner — Chameli Das
(74) Attorney, Agent, or Firm — Staniford Tomita LLP

(57) ABSTRACT

A set of automated unit test components is stored. The automated unit test components include executable code for testing a backup system. The set of automated unit test components are displayed on an electronic screen. A selection of a subset of the unit test components from a user is received. An automated test case is created based on the selected subset of automated unit test components. The automated test case is stored. After the automated test case is created, the automated test case is parsed to derive a manual test case corresponding to the automated test case. The manual test case is stored.

14 Claims, 6 Drawing Sheets

METHOD AND SYSTEM FOR DYNAMIC TEST CASE CREATION AND DOCUMENTATION TO THE TEST REPOSITORY THROUGH AUTOMATION

TECHNICAL FIELD

Embodiments are generally directed to software testing and, more particularly, to automating the creation and documentation of test cases.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Quality assurance (QA) refers to the process of checking to see whether a product or service meets expectations. It is desirable to test software products in order to identify and fix defects, bugs, and other problems before the products are deployed in a production or customer environment. For example, a backup application in a production environment that fails to properly backup data could be disastrous in the event that data needs to be restored. An e-commerce application that fails to properly process payments may lead to missed orders and lost revenue. If defects are reported, it is desirable to attempt to reproduce them and document the steps in order to trace the problem and retest the updated code.

Typically, test cases are created manually for a particular software system, product, service, or application. Once the manual test cases have been created, they can then be automated. Automating a test case from a manual test case allows a particular set of actions or operations to be performed against the system being tested automatically or with little or no user involvement. The conventional process to automate a test case, however, is very laborious: an automation engineer reviews each and every step of a previously created manual test case and develops a custom script. Efforts are often duplicated because in many cases a test case will include steps that overlap with the steps of another test case. Any changes or updates to a manual test case must be manually propagated to the corresponding automated script. It can be very difficult to keep these two in sync.

In some cases, a test case may not be automated because of the time required to create and maintain the corresponding automated test script. This can lead to increased development time because testing may need to be carried out manually. Another problem with traditional methods of testing is that exploratory or ad hoc testing scenarios are often not documented. That is, ad hoc or exploratory test cases are not usually documented in the test repository. Thus, testers may execute some non-documented test cases.

Executing non-documented test cases can cause discrepancies in the test metrics. The lack of a record can lead to uncertainty as to exactly what has been tested. Thus, testers often have to spend a good amount of time to document the exploratory test cases even though such test cases may be used sparingly. The dilemma is that a tester may spend a good amount of time automating the exploratory test cases but the time spent to automate may not be worth spending as they may not be used later or may be used relatively infrequently. Further, defects that are escalated can require a specific scenario to be tested. These test cases are often not documented in the test repository. In some cases, even though they are documented they are not executed as they require a specific scenario which could be a corner case or require a complex setup or a negative test case.

Therefore, there is a need for systems and techniques that provide for dynamic test case creation and documentation to the test repository through automation. It would be desirable to provide for the dynamic creation of a test case and running of it in automated way. Such systems and techniques can provide more confidence in the quality of the product and can reduce the number and severity of mistakes in the future releases as such issues can be easily tested in the current release.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
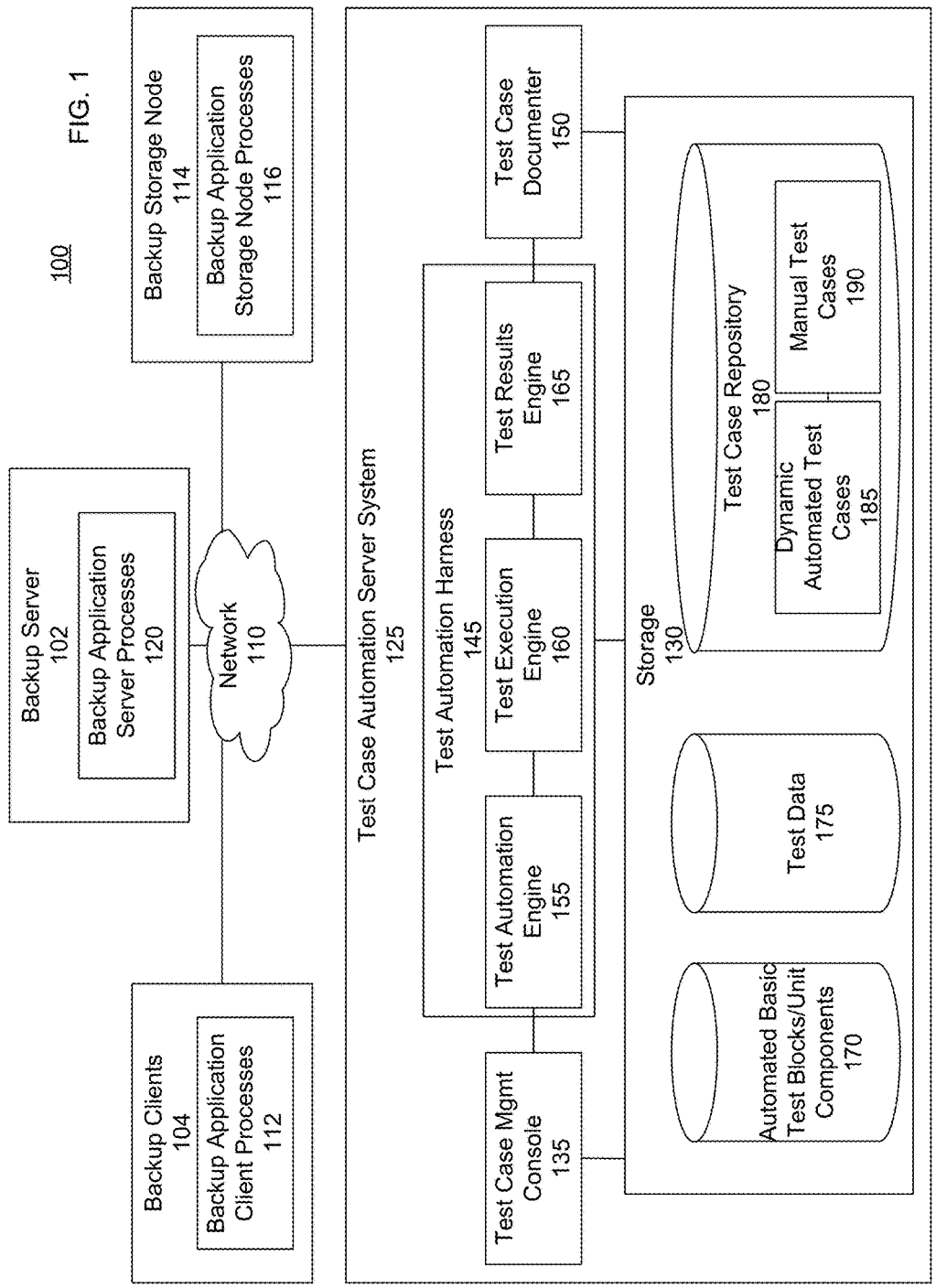
FIG. 1 is a diagram of a large-scale network implementing a test case automation process to develop and document dynamic test cases for a backup application, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for dynamically creating automated test cases and documenting the test cases. In a specific embodiment, the system is configured to test a backup application or backup system. The backup application allows for backing up and restoring data and can be used as part of a disaster recovery solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for backing up and restoring data. In system 100, a number of clients 104 are provided to serve as backup clients or nodes. A network or backup server computer 102 is coupled directly or indirectly to these clients through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in a backup media of a backup storage node 114. The backup media may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, network system 100 includes backup server 102, one or more backup clients 104, and backup storage node 114. A backup client executes processes 112 for backing up data to the storage node, restoring the backed up data, and coordinating with backup server processes 120 on the backup server and processes 116 on the storage node. The backup server processes include processes to index the backups and identify which savesets reside on which backup devices or volumes. The backup storage node executes processes 116 for receiving backup information from the backup client, writing data to the backup devices or volumes, sending tracking information to the backup server to track the data written to the devices or volumes, and reading the data from the devices or volumes at the request of the client during a recovery.

In an embodiment, system 100 may represent a Data Domain Restorer (DDR)-based deduplication storage system, and a storage server or node having the backup media may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as a virtual tape library (VTL) or DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

The computing environment shown in FIG. 1 further includes an automation server system 125. The automation server system may be referred to as a QA system, automation tool, automation framework, or automation suite. The automation server includes storage 130 and several modules including a test case management console 135, a test automation harness 145, and a test case documenter 150. The test automation harness includes a test automation engine 155, a test execution engine 160, and a test results engine 165. Storage includes a repository 170 that stores automated basic test blocks, a repository 175 that stores test data, and a repository 180 that stores dynamically generated automated test cases 185 and manual test cases 190 that correspond to the dynamically generated automated test cases.

The modules run on one or more computing machines. It should be appreciated that the modules shown in FIG. 1 can be functional entities where implementation of the functions may vary. For example, in some cases, the test case documentation module and test automation harness may be combined into one code module. In other cases, the test case documentation module and test automation harness reside in separate code modules. As another example, the dynamic test cases may be stored with or separately from the manual test cases, and so forth.

In a specific embodiment, a method is provided that creates a test case from automation and adds the test case to the test repository. This process is the complete opposite of traditional techniques where the test case is first captured in a test repository and later chosen and automated. A test case can be created based on certain parameters provided using a web-based automation user interface (UI).

Figure 2:
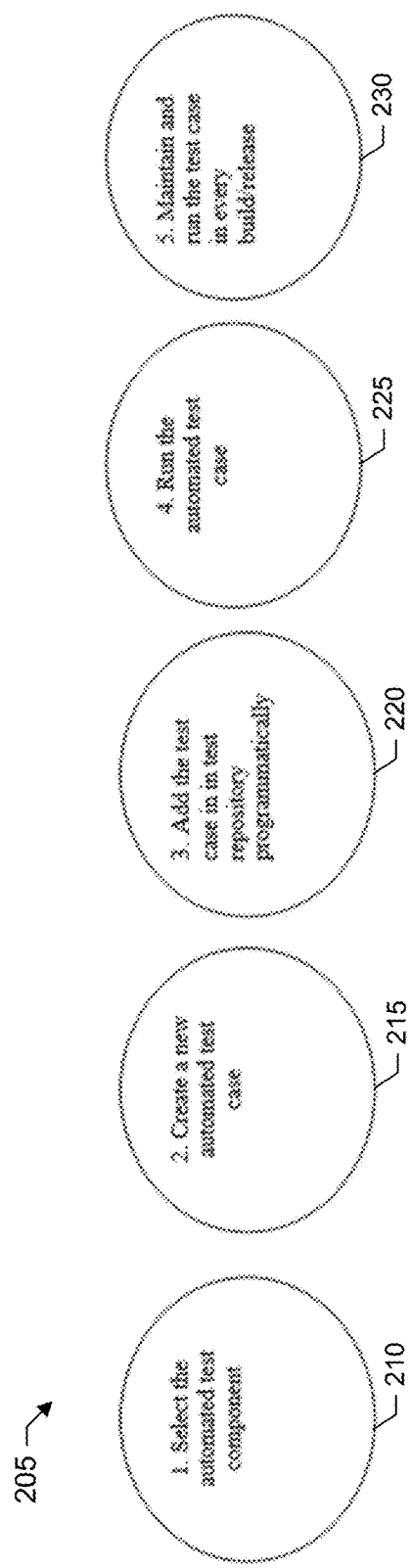
FIG. 2 shows an overall flow of a system for test case automation according to a specific embodiment.

FIG. 2 shows an overall flow 205 of the test case automation system according to a specific embodiment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 210, the automation server system receives a user selection of an automated test component. In a step 215, the system creates an automated test case. In a step 220, the system adds the test case to the test repository programmatically. In a step 225, the system runs the automated test case. In a step 230, the system facilitates the maintenance and running of the test case in every build or release of the software product that is tested.

Some benefits include better and cleaner test metrics; better quality of the product with more test coverage; little or no effort on automating exploratory tests; little or no effort on manual test case creation in the test repository; little or no effort on running newly documented test cases as they are already run in automated way; improved test coverage; and less time spent on exploratory testing.

Figure 3:
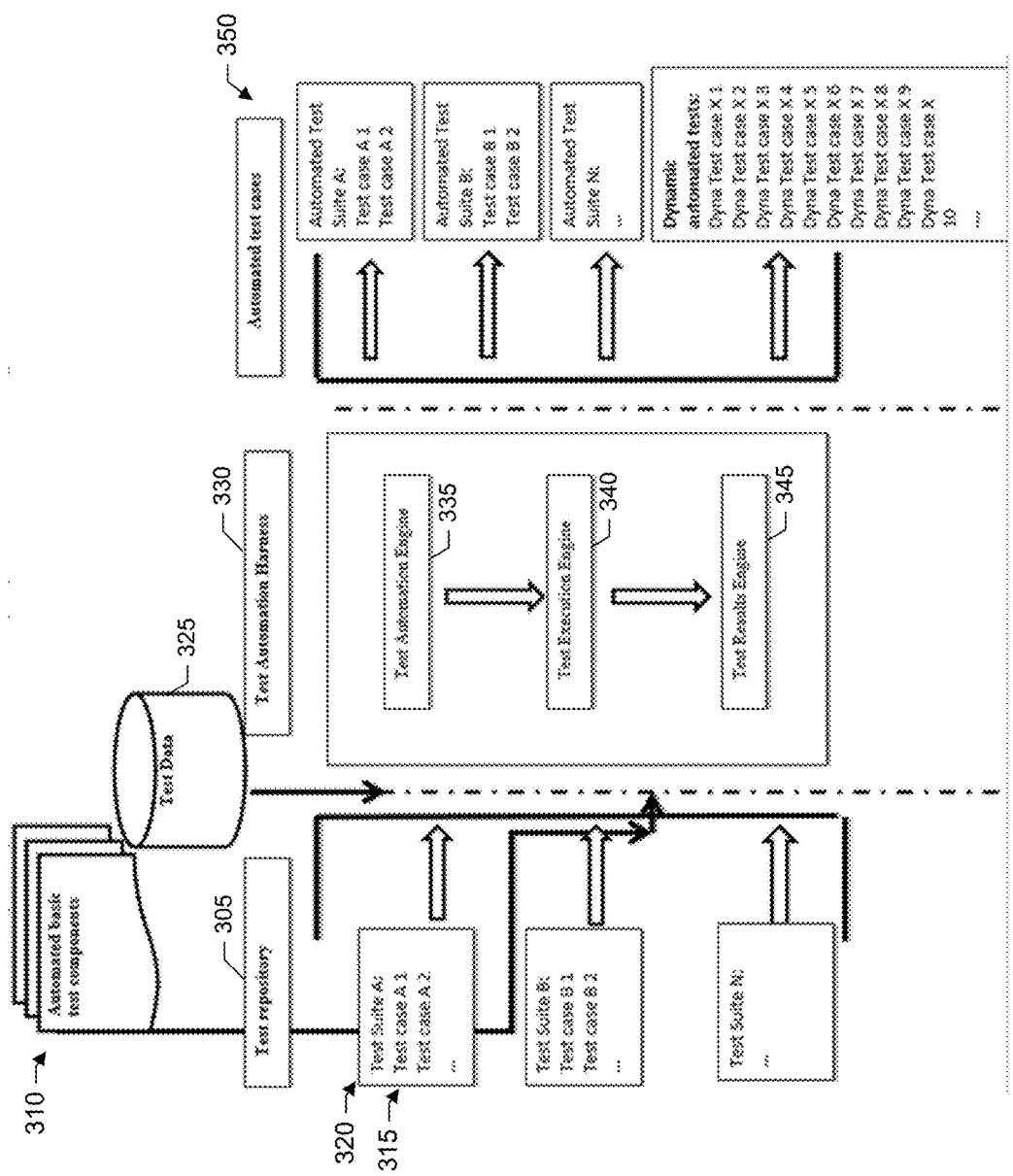
FIG. 3 shows a block diagram of an architecture of a system for test case automation according to a specific embodiment.

FIG. 3 shows a diagram of an architectural design and flow of the test case automation system according to a specific embodiment. As shown in the example of FIG. 3, a test repository 305 stores a set of automated basic test components or blocks 310. A user can select one or more specific basic test components to form test cases 315 and which may be grouped into test suites 320. The test cases can be supplied with test data 325 and provided as input to a test automation harness 330. The test automation harness includes a test automation engine 335, a test execution engine 340, and a test results engine 345. The test automation engine analyzes the selected basic test components and generates automated test cases 350. An automated test case may be referred to as a dynamic automated test case. The dynamic automated test cases are provided as input to the test execution engine which runs the dynamic automated test cases. The test results engine generates test reports based on the execution of the test cases.

Figure 4:
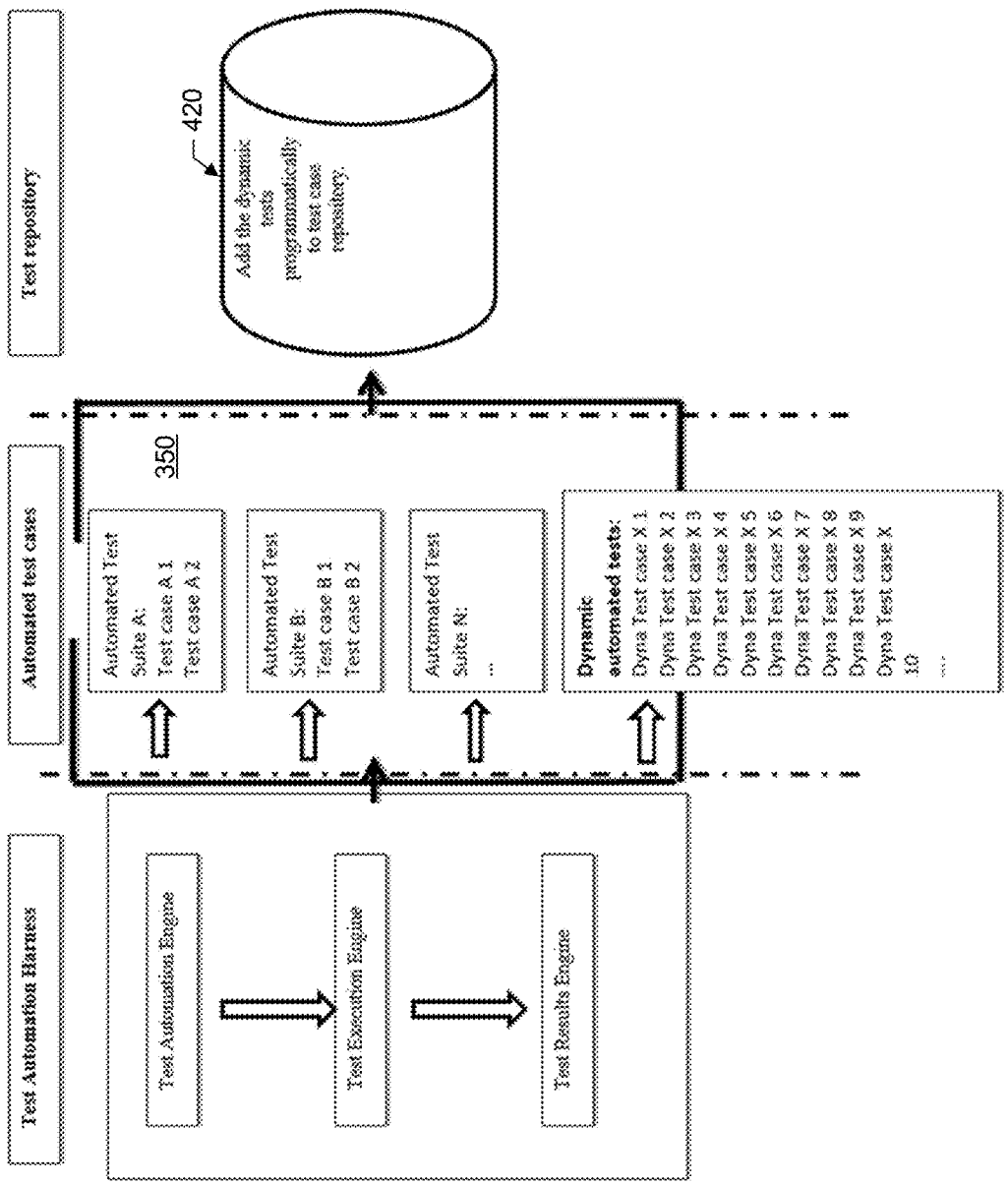
FIG. 4 shows another block diagram of an architecture of a system for test case automation according to a specific embodiment.

FIG. 4 shows another diagram of an architectural design and flow of the test case automation system according to a specific embodiment. The diagram shown in FIG. 4 is a continuation of the diagram shown in FIG. 3 and shows dynamic automated test cases 350 being added programmatically to a test repository 420.

Referring back to FIG. 1, as discussed, repository 170 stores a set of pre-defined automated basic test blocks. An automated basic test block can refer to the smallest unit of a test case and is automated. An automated basic test block may be referred to as an automated test component or automated unit test component. In a specific embodiment, the basic test components are automated as an initial step. That is, the test components include executable code or script. These automated test components function as the test blocks in automating the test cases. These test blocks can be arranged in a very flexible manner along with various types of data to stitch together dynamic test cases. These dynamic test cases can be derived from customer scenarios or corner cases or exploratory test scenarios.

A problem with the conventional style of automation is that a manual test case may be automated in one script and it can be very time-consuming to verify manual test cases. For example, typically the QA process first begins with the development of manual test cases. Some of the manual test cases may then be selected for automation. To automate a manual test case, a QA automation engineer must review each step of an existing manual test case and then develop the automated test script. There can be many different manual test cases, but there is often overlap between at least some of the test case steps. Thus, the QA automation engineer often finds herself developing portions of an automated test script for a particular test case that was previously developed for another test case. This duplication of work is very inefficient and increases the overall time required to test.

In a specific embodiment, a method of automation as disclosed herein provides for creating manual test cases in the test repository based on the scripts that are automated. In other words, in this specific embodiment, automated test scripts are developed before manual test cases are created. The manual test cases are created after the automated test scripts. The test case automation system facilitates the creation of automated and manual test cases. Test cases can be created very easily and run. As a result, many more test cases can be developed to ensure that a particular product (e.g., software product, system, component, module, or service) is thoroughly tested, performs as expected, and is relatively free of bugs, problems, and defects. This helps to increase confidence in the quality of the product because many test scenarios can be covered.

An automated test block may specify or define one or more commands, actions, tasks, or operations to be performed for the product being tested. The product or system to be tested may include a software product, component, application program, portion of an application program, database, service, application programming interface (API), function, library, code component, code module, and so forth.

For example, an automated test block may include an executable script or code that specifies one or more actions to be performed such as launch application, access login page, input user credentials (e.g., user name and password), create test file, create test directory, configure, and so forth. An automated test block may specify a task to be performed by the file system associated with the system being tested (e.g., create file, create directory, rename file, or rename directory), a task to be performed by the system being tested, or both. Tasks to be performed by the system being tested may include any action or combination of actions that are available or associated the system being tested. There can be actions to configure the system or device associated with the system.

The automated test blocks may be tailored towards or based on the system being tested. For example, in a specific embodiment, the system being tested is a backup application. In this specific embodiment, the automated test blocks may be associated with backup mechanisms, options, settings, configurations, properties, attributes, devices, or processes that are available in the backup application.

Repository 175 stores test data that may be provided as input to a test case. Test data includes the data used by the test cases. The test data may similarly be tailored towards or based on the system being tested. For example, if the system being tested is a backup application, the test data generated may include various groups of different amounts of test data. A first group of test data may be of a first size (e.g., 500 gigabytes (GB)). A second group of test data may be of a second size (e.g., 1 terabyte (TB)), different from the first size. For example, the first and second groups of data may include first and second test databases, respectively. Generating different amounts of backup test data helps to ensure that the backup application will properly backup data regardless of the amount. As another example, if the system being tested is an e-commerce application, the test data generated may include sample customer orders to be fulfilled by the e-commerce application.

The test case management console provides a user interface for a user to select the components, such as the pre-defined automated test blocks or unit test components, which are to form a dynamic test case. The user interface may be a graphical user interface (GUI) in which the user uses a pointing device (e.g., mouse) to select the particular components to be included in a test case. The interface may include a programmatic interface. The interface may include a command line interface. The test case management console receives and packages the user selections. The user selections are then passed or dispatched to the test automation harness. The user can use the management console to create, manage, update, maintain (e.g., delete test cases or update test cases), and select the dynamic test cases to run.

The test automation harness includes a framework to facilitate the automation of test cases. The selected automated unit test components including a specification of test data via the management console may be provided as input to the framework, or more specifically, provided to the test automation engine. The framework includes a collection of software to test a system or program unit of the system by running it according to a test case and monitoring its behavior and outputs.

The test automation engine is responsible for dynamic test case creation. Dynamic test case creation includes the creation or generation of the test steps programmatically. The test automation engine is a component of the automation framework that facilitates the automation of the user selections into a dynamic test case. For example, the test automation engine may integrate, assemble, or process the user selected automated basic test blocks or unit test components, test data specifications, and other test case options to form a dynamic test case. The dynamic test case may include a script. A script may include parameters, data, values, and a list of commands that can be executed without user interaction.

Upon the creation of a dynamic test case, the dynamic test case is stored in the test case repository. The test repository provides a centralized location for storing all the test cases which may include dynamic test cases, manual test cases, or both.

The test execution engine is a component of the framework that is responsible for executing the dynamic test cases. For example, the test execution engine may retrieve a dynamic test case from the test case repository and run the retrieved test case against the application to be tested. The test results engine is a component of the framework that reports the results of executed test cases (e.g., pass or fail). For example, the results of an executed test may be displayed by the test results engine on an electronic screen, printed on a paper report, or both.

The test case documenter is responsible for parsing a dynamic test case and translating the dynamic test case into a corresponding manual test case. The manual test case can then be stored in the test case repository. For example, in a specific embodiment, the test case that is initially created by the system is a dynamic test case that includes a script. A script conforms to the syntax of a particular scripting language and can be difficult to understand—especially for non-technical users or users who are not programmers or developers. A manual test case, however, can be much easier to understand because it describes the test case using a natural language rather than a programming language. After a dynamic test case is created, the test case documenter provides an automatic abstraction or conversion of the dynamic test case to a manual test case.

The test case documenter may use any competent technique or combinations of techniques to derive a manual test case from a dynamic test case. Such techniques may include, for example, named entity recognition (NER), natural language generation (NLG), content determination, document structuring, aggregation, lexical choice, referring expression generation, realization, syntax analysis, morphology analysis, and orthography analysis, among others.

The test case automation server system can maintain both a dynamic test case and a corresponding or associated manual test case. The dynamic test case is executable. That is, the dynamic test case includes code or instructions that can be executed by a computer processor. The dynamic test case can be run like a program in the computer. A dynamic test case may be formatted, for example, as a Windows Script File (.WSF), executable file format (.EXE), batch file format (.BAT), and so forth. The corresponding manual test case may not be executable and may be formatted as a text file (.TXT), Microsoft Word document (.DOC), Microsoft Excel document (.XLS), and so forth.

For example, table A below shows an example of a script that may be generated by the test automation harness based on a user's selection from the test case management console of one or more automated basic test blocks or unit test components.

TABLE A

```
nRowCount=DataTable.GlobalSheet.GetRowCount
systemutil.CloseProcessByName "chrome.exe"
For i = 1 to nRowCount
    Systemutil.Run "chrome", "http://networker_backup.com"
    Browser("title :=.*").Page("title":=.*").Sync
    DataTable.GlobalSheet.SetCurrentRow(i)
    sEmailid=Datatable("UserName",Global)
    sPassWord=Datatable("Password",dtGlobalSheet)
    Browser("title:=.*").Page("title:=.*").WebEdit("name:=Email").Set sEmailid
    Browser("title:=.*").Page("title:=.*").WebEdit("name:=Passwd").Set sPassword
    Browser("title:=.*").Page("title:=.*").WebEdit("name:=Sign in").Click
    Browser("title:=.*").Page("title:=.*").Sync
    wait(10)
    If left(browser("title:=.*").Page("title:=.*").getROProperty("title"),13) = "Welcome" Then msgbox("Login Successful")
    Else msgbox("Login Unsuccessful")
    End if
    Systemutil.closeProcessByName "chrome.exe"
Next
```

Table B shows an example of a manual test case based on the automated script in table A above.

TABLE B

| Step | Description |
| --- | --- |
| 1 | Launch the backup application at the URL <http://networker_backup.com> using the Chrome browser |
| 2 | Navigate to the login page |
| 3 | Enter a user email in the email field |
| 4 | Enter a user password in the password field |
| 5 | Click the sign in button |

In the example above, the automated basic test blocks or unit test components selected by the user for the test case may include first, second, third, fourth, and fifth automated basic test blocks or unit test components. The first test block may specify a particular browser to be launched (e.g., Google Chrome, Microsoft Internet Explorer, or Apple Safari). The second test block may specify navigation to the login page. The third test block may specify the input of a user email (or username) at the login page. The fourth test block may specify the input of a user password at the login page. The fifth test block may specify the clicking of the sign-in or login button.

It should be appreciated that these are merely examples of automated basic test blocks or unit test components. There can be many other different automated test blocks or unit test components. An automated block or component may specify a single action, operation, command, or task or combinations of actions, operations, commands, or tasks. For example, the entering of user credentials (e.g., user email/username and password) may be combined into a single automated basic test block or unit test component.

Organizations can decide the level of granularity in which automated basic test blocks or unit test components should be defined. Having automated basic test blocks at a very granular level helps to reduce code duplication. For example, having separate automated test blocks for launching a particular browser and supplying login credentials can be more advantageous as compared to having a single automated basic test block that both launches a particular browser and supplies login credentials.

In the latter, the script to supply login credentials may need to be written for each of the multiple browsers (e.g. Chrome, Internet Explorer, and Safari). In the former, the script to supply login credentials can be written once as a single automated basic test block which can then be combined with other automated basic test blocks that launch particular browsers. For example, to create a first test case which tests logging into the application using a first browser (e.g., Chrome), the user can select a first test block specifying the launch of the Chrome browser and select a second test block that supplies login credentials. To create a second test case which tests logging into the application using a second browser (e.g., Internet Explorer), different from the first browser, the user can select a third test block specifying the launch of the Internet Explorer browser and select the second test block that supplies the login credentials, and so forth.

However, having many automated basic test blocks or unit test components at a very granular level can be difficult to manage because of the large number of test blocks or components. A factor to consider when defining an automated basic test block or unit test component includes the number of steps or actions that are likely to be repeated in other testing scenarios. A step or action that is likely to be repeated in other testing scenarios may be defined within a single automated basic test block. A step or action that is not likely to be repeated in other testing scenarios may be combined with other steps or actions in a single automated basic test block.

Figure 5:
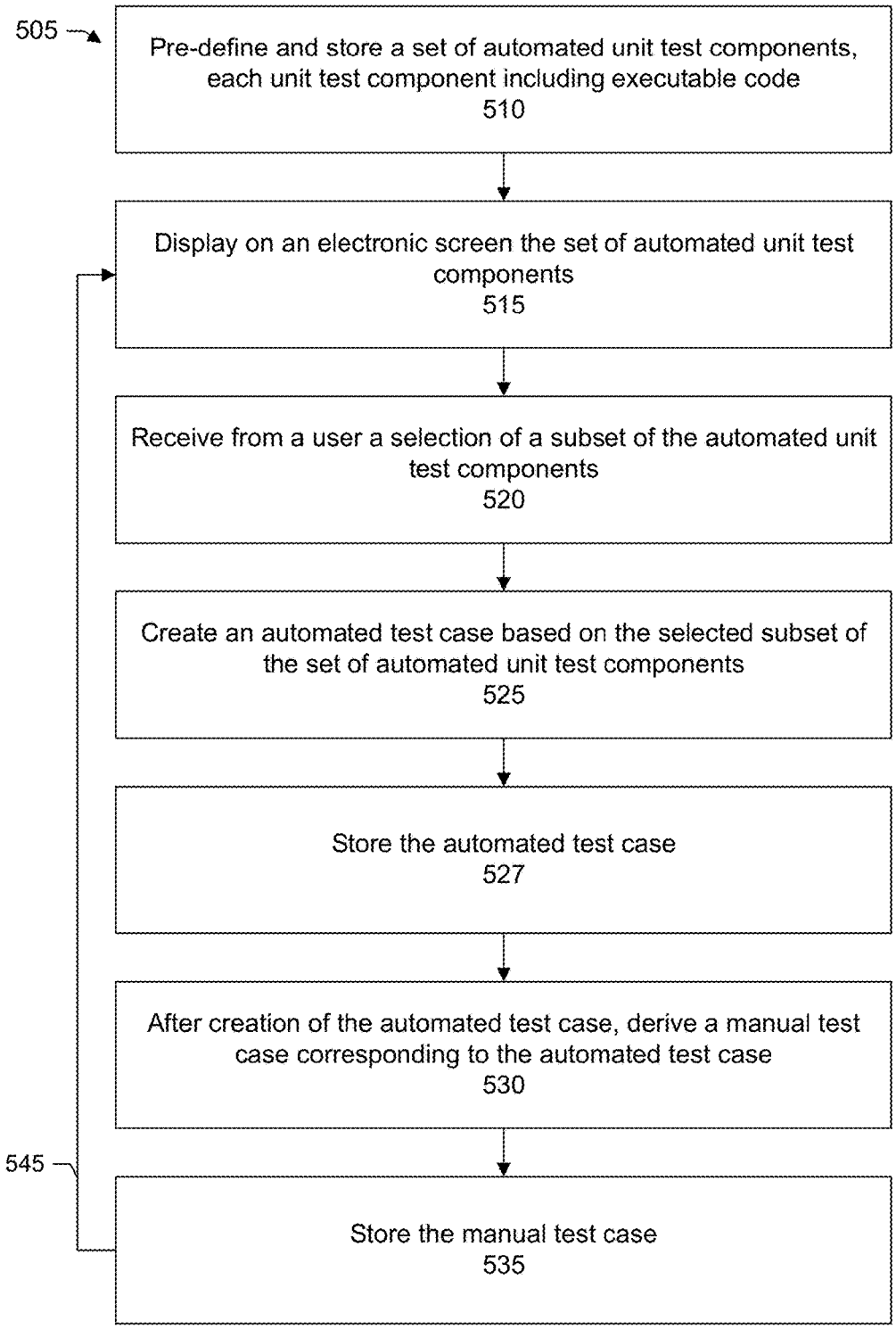
FIG. 5 shows a flow diagram for generating and documenting a dynamic automated test case according to a specific embodiment.

FIG. 5 shows an overall flow 505 of a test case automation system. In a step 510, a set of automated basic test blocks or unit test components are pre-defined and stored. For example, these automated unit test components may be defined and stored before test cases have been created. In other words, test cases may not exist when the automated unit test components are defined and stored. Each automated test component may be stored as a unit separate from another automated test component. In some cases, an automated unit test component may be independent of another automated unit test component. The automated unit test components may be decoupled from each other. For example, an automated unit test component may be updated or deleted. The updating or deleting may not affect another automated unit test component. In other cases, an automated unit test component may be dependent on another automated unit test component. For example, an automated unit test component may be updated or deleted. The updating or deleting may affect another automated unit test component.

In a step 515, the test case automation system displays on an electronic screen the set of automated unit test components for a user to select. The user may be a technical user (e.g., QA automation engineer) or a non-technical user.

In a step 520, the system receives from a user a selection of a subset of the automated unit test components. For example, depending upon the test case that the user wishes to have created, the system may receive one, two, three, four, five, six, seven, eight, nine, ten, or more than ten selected automated unit test components (e.g., 15, 20, 25, or more than 25 selections). The system may prompt the user to input a name for the automated test case that is to be created.

In a step 525, the system dynamically creates an automated test case based on the selected subset of the set of automated unit test components. Creating an automated test case may include generating the automated test case based on a sequence or order in which the automated unit test components were selected. Selecting a first automated unit test component before a second automated unit test component may generate a first automated test case. Selecting the second automated unit test component before the first automated unit test component may generate a second automated test case, different from the first automated test case.

For example, the first automated unit test component may include code for inputting a user name. The second automated unit test component may include code for inputting a password. The first automated test case may test a scenario where a customer attempts to input a password after inputting a user name. The second automated test case may test a scenario where the customer attempts to input a password before inputting a user name.

Creating an automated test case may include adding or combining first and second scripts (or copies of the first and second script) to form a third script. The first script is from a first automated unit test component, and the second script is from a second automated unit test component, different from the first automated unit test component. In other words, two or more automated unit test components may be stitched, linked, or chained together to form an automated test case.

Creating an automated test case may include adding a second script to an end of a first script, adding a second script to a beginning of the first script, inserting the second script into the first script, editing or altering the first script to accommodate the second script, editing or altering the second script to accommodate the first script, editing or altering the combined first and second script, adding script information to the combined first and second script, deleting script information from the combined first and second script, replacing a portion of the first script with a portion of the second script, adding or inserting data from a selected automated unit test component, adding or inserting parameters or settings or values from a selected automated unit test component, editing or altering data based on a selected automated unit test component, editing or altering parameters or settings or values based on a selected automated unit test component, or combinations of these.

In a step 527, the automated test case is stored. In a step 530, after creation of the automated test case, the system parses the automated test case to automatically derive a manual test case corresponding to the automated test case. In other words, when the automated test case is created, the corresponding manual test case may not yet exist. Rather, the manual test case is created after the automated test case is created. As discussed above, the system analyzes or reviews the automated test case and, based on the analysis, converts or translates the automated test case into a manual test case.

In a step 535, the manual test case is stored. The manual test case may be stored after the automated test case is stored since the manual test case is not created until after the automated test case is created. In other words, the automated test case is stored before the manual test case is stored. Steps 515-535 can be repeated 545 to dynamically create and document any number of additional test cases.

In another specific embodiment, the system may include logic that randomly selects various automated unit test components to form any number of automated test cases. The logic can be used to mimic ad hoc or exploratory testing. The automated unit test components may be weighted differently to increase the probability that a particular automated unit test component will be selected more frequently than another particular automated unit test component. For example, an automated unit test component that tests a key process (e.g., security) may be weighted more heavily than another automated unit test component that tests a less critical process. This helps to ensure good testing coverage of the key processes and components under different scenarios.

Figure 6:
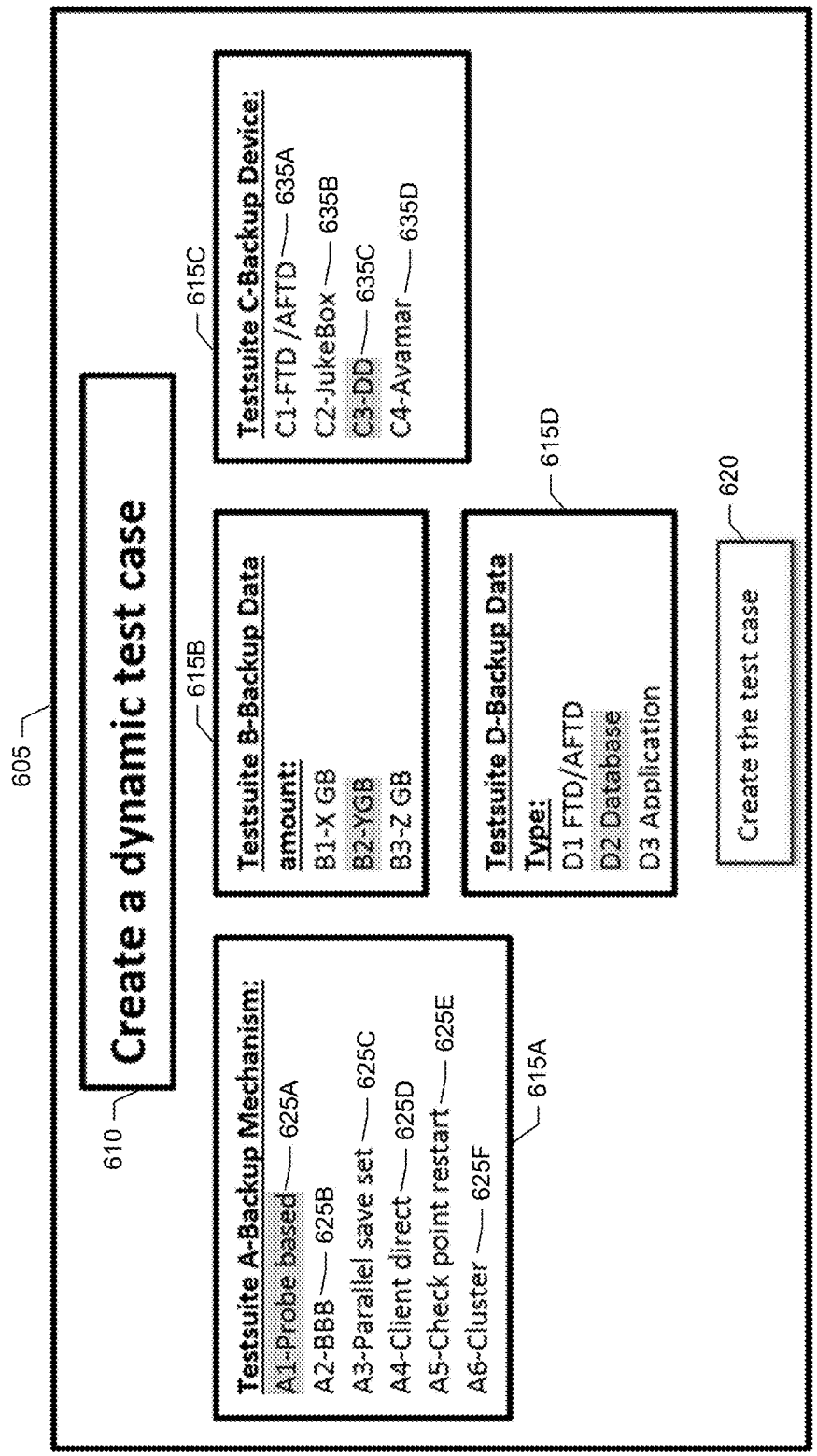
FIG. 6 shows an example of a graphical user interface for creating a dynamic automated test case according to a specific embodiment.

FIG. 6 shows an example of a graphical user interface (GUI) 605 that may be displayed on an electronic screen for the user by the test case management console. The GUI may be displayed within a browser or other application program window. In this specific embodiment, the automation system is configured for testing a backup application. In this example, the GUI includes a title bar 610, a first selection box 615A, a second selection box 615B, a third selection box 615C, a fourth selection box 615D, and a button 620.

The title bar indicates to the user that they are creating a dynamic test case. The selection boxes lists the various sets of automated basic test blocks or automated unit test components. The automated basic test blocks or unit test components may be classified or organized into any number of groups in order to facilitate selection.

As discussed above, in a specific embodiment, a prerequisite is that all the unit test components are automated and available in the automation suite. In other words, prior to or before creating a test case, there will be a set of automated unit test components that have been defined and stored.

In the example shown in FIG. 6, the first selection box lists automated unit test components that correspond to various backup mechanisms available in the backup application. These backup mechanisms include a probe based backup 625A, a block based backup (BBB) 625B, a parallel saveset backup 625C, a client direct backup 625D, a check point restart backup 625E, and a cluster backup 625F.

Probe backups are scheduled backups that rely on executing a custom command/script on one or more clients within a group to determine whether the backup should be run. Additionally, rather than running just once per day, probe backups are designed to be run as frequently as necessary (e.g., as frequently as every 15 minutes) over a defined start and stop window. In a probe backup, there can be a probe at a backup client or host to detect changes.

In some embodiments, a client-based probe may review a database. For example, a script may be used to generate a log of activity taking place in a database. A probe may monitor characteristics of a log (such as size, and so forth). If a monitored characteristic reaches a user-defined criteria (such as a log reaching 1 GB in size), a probe may indicate that a backup should be performed. The probe based automated test component may include a script, for example, that directs the installation of a probe at a backup test client.

Block based backups (BBB) can read data directly from the disk or volume. File systems can be backed up by performing block based backups. This can significantly speed up the backup of large/dense file systems. If there are dense file systems (large scale IMAP (Internet Message Access Protocol) servers for example), a BBB can increase backup performance by up to an order of magnitude or more.

Parallel Save Streams (PSS) allows for a single High Density File System (HDFS) to be split into multiple concurrent savesets to speed up the backup walk process and therefore the overall backup. For example, rather than backing up a single file system or single saveset as a single save operation, parallel save streams allow a single saveset to be split into multiple streams. For example, there can be options for two, three, four, or more than four parallel save streams per saveset for PSS enabled clients. Parallel save streams may include automatic stream reclaiming, which can dynamically increase the number of active streams for a saveset already running in PSS mode to maximize or increase the utilization of client parallelism settings.

A client direct backup allows for a client to communicate directly with the backup device rather than going through a storage node.

The checkpoint restart mechanism allows for restarting a backup in case of failure. For example, if for some reason the connection to a backup fails during the process, rather than restarting it from the very start of the backup, the backup application should be able to restart it from either the last directory the save process had entered, or, the last file it had started. The checkpoint restart automated test component may include a script, for example, that directs the termination and re-establishment of a backup connection.

The second selection box lists different amounts of backup test data that may be generated for backup. For example, the user may select 5 megabytes (MB) of test data to backup, 500 MB of test data to backup, 500 GB of test data to backup, or any other amount as desired. This helps to ensure that the backup application is capable of backing up different amounts of data. In a specific embodiment, the automated unit test components listed in the second selection box correspond to pre-defined automated scripts that can generate the selected amount of backup test data.

The third selection box lists the type of backup target device. In the example shown in FIG. 6, the options include an FTD/AFTD (file type device/advanced file type device) 635A, Jukebox 635B, DD (Data Domain) appliance 635C, and Avamar 635D. A file type device (FTD) refers to a basic disk device. Advanced file type devices (AFTD) support concurrent backup and restore operations. An AFTD may be configured as a local disk or a network-attached disk. A jukebox may include a device that stores multiple CD-ROMs and uses a mechanical arm, carousel or other device to bring the disk to an optical station for reading and writing. A jukebox can reside in a PC or be an external device. A jukebox may hold as many as 500 disks or more and have multiple readers and drives to allow a network of users to simultaneously access data.

A DD (Data Domain) appliance may refer to a device residing on the storage system that includes the DD Boost processes, functions, module, or library. A DD Boost device can store backup data in a highly compressed and deduplicated format. An Avamar data store provides a node-based grid solution. Each node has a specific capacity and if additional backup storage is required, additional nodes can be added to the grid. Data is striped within the nodes and also striped across the nodes for additional protection. In a specific embodiment, the automated unit test components listed in the third selection box correspond to pre-defined automated scripts that can configure or initialize the selected backup device.

The fourth selection box lists the type of backup data type. In the example shown in FIG. 6, the options include FTD/AFTD 640A, database 640B, and application 640C. In a specific embodiment, the automated unit test components in the fourth selection box correspond to pre-defined automated scripts that generate data of the selected type.

Some of the options in FIG. 6 are highlighted as an example to indicate the user's selection. Table C below shows an example of a flow.

TABLE C

| Step | Description |
| --- | --- |
| 1 | The user chooses the automated unit test components, e.g., A1, A2 . . . B1, B2, . . . C1, C2 . . . D1, D2 . . . |
| 2 | The user clicks the button "Create the test case" 620: The system performs the below operations 3a-3f. |
| 3a | Generates code with a test case name 'DynamicA1B2C3' with a backup of nature 'probe based' with 'Y' amount of data to 'Data domain' device with a backup data type as 'Database'. |
| 3b | Runs the code. |
| 3c | Captures the results in a log file. |
| 3d | Documents the test case steps |
| 3e | Updates test case repository |
| 3f | Executes the test case in test repository with a marking of pass or fail. |

In this example, the generated code (step 3a) includes code to perform a probe based backup, code to generate a Y amount of data to backup, code to configure the probe backup to a Data Domain device, and code to generate a database to backup. For example, the generated data may include a database file, e.g., Microsoft Exchange Database file (.EDB file), database log files (e.g., .LOG file), uncommitted log files, committed log files, or combinations of these.

Tables D-G below show examples of pseudo code for the selected automated unit test blocks for this example. Table H below shows an example of pseudo code of a dynamic test case that may be created from the selected automated unit test blocks for this example.

TABLE D

```
# Block # 1 Take the back up
    proc CreateBasicBkupPolicy { pName sName asName aName client
{actionSchedule satDefault}
```

TABLE E

```
# Block # 2 Create data
set dname [CreateDirs $hosts($TEST_CMD_HOST,tree)/backup 1 5]
for {set i 1} {$i <= 5} {incr i} {
    # Create 10 1k files in each of the 5 subdirs . . ./dir0-1/dir1-1
    set fname [CreateFiles $hosts($TEST_CMD_HOST,tree)/
backup/${dname}0-1/${dname}1-${i} 1k 10]
}
```

TABLE F

```
# Block # 3 Select device
if { [LabelAndMountVol \
    $devices($TEST_TAPE_HOST,$TEST_DEVICE_PRIMARY,name)
        TestBackup] == -1 } {CleanupBasicBkupPolicy $policy $as
    fail "Label and mount primary device \
```

TABLE F-continued

```
    $devices($TEST_TAPE_HOST,$TEST_DEVICE_PRIMARY,name)
        failed"
    TCEnd $TC fail
    return
}
```

TABLE G

Block # 4 Select the object to backup
File / application /database

TABLE H

Dynamic test case

```
# Step #1 Create the test case
Combination of all the above 4 blocks with the parameters taken from
the above UI.
# Step #2 Run the test case
# Step #3 Connect to Test repository API
Dim QCConnection
' Return the TDConnection object.
Set QCConnection = CreateObject("TDApiOle80.TDConnection")
QCConnection.InitConnectionEx "http:///qcbin"
QCConnection.login "<username>", "<password>"
' DEFAULT = Domain, QualityCenter_Demo = Project
QCConnection.Connect "DEFAULT", "QualityCenter_Demo"
# Step #4 Results in a log file
log_info "Created a back up with probebased"
log_info "Created the data"
log_info "Created the device"
log_info "Created the database backup"
log_info "Created the test case in Test repository QC"
log_info "Ran the test case"
log_info "Marked the test case status"
```

In a specific embodiment, a method includes storing a plurality of automated unit test components, each automated unit test component comprising executable code for testing a backup system; displaying, on an electronic screen, the plurality of automated unit test components; receiving, from a user, a selection of a subset of the plurality of automated unit test components; creating an automated test case based on the selected subset of the plurality of automated unit test components; storing the automated test case; after the creating an automated test case, parsing the automated test case to derive a manual test case corresponding to the automated test case; and storing the manual test case.

The plurality of automated unit test components may include first, second, third, and fourth groups of automated unit test components, wherein automated unit test components in the first group may include code for testing different backup mechanisms of the backup system, automated unit test components in the second group may include code for generating different amounts of backup data, automated unit test components in the third group may include code for configuring different types of backup target devices, and automated unit test components in the fourth group may include code for generating different types of backup data.

The method may include executing the automated test case against the backup system. In an embodiment, the automated test case comprises executable code and the manual test case does not comprise executable code. Creating an automated test case may include adding a copy of a first script to a copy of a second script, wherein the first script is from a first automated unit test component of the subset, and the second script is from a second automated unit test component of the subset.

In another specific embodiment, there is a system for dynamically creating and documenting a test case to test a backup application, the system comprising: a processor-based system executed on a computer system, a computer-readable memory having computer-executable code, the computer-readable memory coupled to a processor of the processor-based system, wherein the processor when executing the computer-executable code is configured to: store a plurality of automated unit test components, each automated unit test component comprising executable code for testing the backup application; display, on an electronic screen, the plurality of automated unit test components; receive, from a user, a selection of a subset of the plurality of automated unit test components; create an automated test case based on the selected subset of the plurality of automated unit test components; store the automated test case; after the creation of an automated test case, parse the automated test case to derive a manual test case corresponding to the automated test case; and store the manual test case.

In another specific embodiment, there is a computer program product, comprising a non-transitory computer-readable medium having a computer-readable program code embodied therein, the computer-readable program code adapted to be executed by one or more processors to implement a method comprising: storing a plurality of automated unit test components, each automated unit test component comprising executable code for testing a backup system; displaying, on an electronic screen, the plurality of automated unit test components; receiving, from a user, a selection of a subset of the plurality of automated unit test components; creating an automated test case based on the selected subset of the plurality of automated unit test components; storing the automated test case; after the creating an automated test case, parsing the automated test case to derive a manual test case corresponding to the automated test case; and storing the manual test case.

In a specific embodiment, the dynamically generated automated test cases and manual test cases are applied to testing a backup application. It should be appreciated, however, that the system can be configured to dynamically generate automated test cases and manual test cases for any type of application or system. Some specific examples of other types of applications or systems include e-commerce applications, social networking applications, e-learning applications, mobile applications, productivity applications, collaboration products, databases, and many more.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
storing a plurality of automated unit test components, each automated unit test component comprising executable code for testing a backup system;
displaying, on an electronic screen, the plurality of automated unit test components;
receiving, from a user, a selection of a subset of the plurality of automated unit test components;
creating an automated test case based on the selected subset of the plurality of automated unit test components, the automated test case comprising a programming language;
storing the automated test case;
after the creating an automated test case, parsing the automated test case comprising the programming language to derive a manual test case comprising a natural language and corresponding to the automated test case; and
storing the manual test case, wherein the plurality of automated unit test components comprises first, second, third, and fourth groups of automated unit test components, wherein automated unit test components in the first group comprise code for testing different backup mechanisms of the backup system,
automated unit test components in the second group comprise code for generating different amounts of backup data,
automated unit test components in the third group comprise code for configuring different types of backup target devices, and
automated unit test components in the fourth group comprise code for generating different types of backup data.

2. The method of claim 1 comprising:
executing the automated test case against the backup system.

3. The method of claim 1 wherein the automated test case comprises executable code and the manual test case does not comprise executable code.

4. The method of claim 1 wherein the creating an automated test case comprises:
adding a copy of a first script to a copy of a second script, wherein the first script is from a first automated unit test component of the subset, and the second script is from a second automated unit test component of the subset.

5. The method of claim 1 wherein the manual test case does not exist during the creating an automated test case.

6. The method of claim 1 wherein the automated test case comprising the programming language is provided as input to a test case documenter code module to obtain the manual test case comprising the natural language.

7. A system for dynamically creating and documenting a test case to test a backup application, the system comprising:
a processor-based system executed on a computer system, a computer-readable memory having computer-executable code, the computer-readable memory coupled to a processor of the processor-based system, wherein the processor when executing the computer-executable code is configured to:
store a plurality of automated unit test components, each automated unit test component comprising executable code for testing the backup application;
display, on an electronic screen, the plurality of automated unit test components;
receive, from a user, a selection of a subset of the plurality of automated unit test components;
create an automated test case based on the selected subset of the plurality of automated unit test components, the automated test case comprising a programming language;
store the automated test case;
after the creation of an automated test case, parse the automated test case comprising the programming language to derive a manual test case comprising a natural language and corresponding to the automated test case; and
store the manual test case, wherein the plurality of automated unit test components comprises first, second, third, and fourth groups of automated unit test components, wherein automated unit test components in the first group comprise code for testing different backup mechanisms of the backup system,
automated unit test components in the second group comprise code for generating different amounts of backup data,
automated unit test components in the third group comprise code for configuring different types of backup target devices, and
automated unit test components in the fourth group comprise code for generating different types of backup data.

8. The system of claim 7 wherein the processor-based system is configured to:
executing the automated test case against the backup system.

9. The system of claim 7 wherein the automated test case comprises executable code and the manual test case does not comprise executable code.

10. The system of claim 7 wherein the processor-based system is configured to:
add a copy of a first script to a copy of a second script, wherein the first script is from a first automated unit test component of the subset, and the second script is from a second automated unit test component of the subset.

11. A computer program product, comprising a non-transitory computer-readable storage medium stored a computer-readable program code embodied therein, the computer-readable program code adapted to be executed by one or more processors to implement a method comprising:
storing a plurality of automated unit test components, each automated unit test component comprising executable code for testing a backup system;
displaying, on an electronic screen, the plurality of automated unit test components;
receiving, from a user, a selection of a subset of the plurality of automated unit test components;
creating an automated test case based on the selected subset of the plurality of automated unit test components, the automated test case comprising a programming language;
storing the automated test case;
after the creating an automated test case, parsing the automated test case comprising the programming language to derive a manual test case comprising a natural language and corresponding to the automated test case; and
storing the manual test case, wherein the plurality of automated unit test components comprises first, second, third, and fourth groups of automated unit test components, wherein automated unit test components in the first group comprise code for testing different backup mechanisms of the backup system, automated unit test components in the second group comprise code for generating different amounts of backup data, automated unit test components in the third group comprise code for configuring different types of backup target devices, and automated unit test components in the fourth group comprise code for generating different types of backup data.

12. The computer program product of claim 11 wherein the method comprises:

executing the automated test case against the backup system.

13. The computer program product of claim 11 wherein the automated test case comprises executable code and the manual test case does not comprise executable code.

14. The computer program product of claim 11 wherein the creating an automated test case comprises:

adding a copy of a first script to a copy of a second script, wherein the first script is from a first automated unit test component of the subset, and the second script is from a second automated unit test component of the subset.

* * * * *